(12) United States Patent
Kondapalli

(10) Patent No.: US 8,045,456 B1
(45) Date of Patent: Oct. 25, 2011

(54) HIERARCHICAL PORT-BASED RATE LIMITING

(75) Inventor: Raghu Kondapalli, San Jose, CA (US)

(73) Assignee: Marvell International Ltd. (BM)

( * ) Notice: Subject to any disclaimer, the term of this patent is extended or adjusted under 35 U.S.C. 154(b) by 372 days.

(21) Appl. No.: 11/944,003

(22) Filed: Nov. 21, 2007

Related U.S. Application Data

(60) Provisional application No. 60/867,258, filed on Nov. 27, 2006.

(51) Int. Cl.
*H04L 12/26* (2006.01)

(52) U.S. Cl. .................................................... 370/229

(58) Field of Classification Search .......... 370/229–236, 370/252, 395.21, 464, 465; 709/227–235
See application file for complete search history.

(56) References Cited

U.S. PATENT DOCUMENTS

| | | | | |
|---|---|---|---|---|
| 5,412,647 A * | 5/1995 | Giroux et al. | ................ | 370/232 |
| 5,596,576 A * | 1/1997 | Milito | ......................... | 370/450 |
| 6,370,116 B1 * | 4/2002 | Giroux et al. | ................ | 370/232 |
| 6,826,150 B1 * | 11/2004 | Bhattacharya et al. | ....... | 370/230 |
| 7,327,682 B2 * | 2/2008 | Gandhi et al. | ............ | 370/235.1 |
| 7,430,173 B2 * | 9/2008 | St. Denis et al. | ........... | 370/235.1 |
| 7,646,718 B1 * | 1/2010 | Kondapalli et al. | ........ | 370/235.1 |
| 7,843,843 B1 * | 11/2010 | Papp et al. | ................... | 370/252 |
| 2007/0201499 A1* | 8/2007 | Kapoor et al. | ................ | 370/412 |
| 2007/0297414 A1* | 12/2007 | Gupta et al. | ................ | 370/395.4 |

* cited by examiner

*Primary Examiner* — Dmitry H Levitan

(57) ABSTRACT

A system for regulating traffic in a computer network comprises a plurality of rate buckets associated with a network interface ingress port. The system includes at least two rate buckets, related hierarchically, assigned to a specific ingress port on a network equipment device. At least one traffic parameter is associated with each rate bucket. Each rate bucket monitors traffic based on individual user-defined traffic parameters. At least one packet threshold parameter is associated with each rate bucket. Packets exceeding a rate bucket's packet threshold parameter are sent to subsequent rate buckets within the hierarchy based on an aggregate information rate assigned to the port. Each hierarchical rate bucket assigned to a specific port evaluates each packet prior to discarding a packet.

18 Claims, 4 Drawing Sheets

| Parameter | Description |
|---|---|
| EBS_Limit_Action | If the incoming port information rate exceeds the EBS_Limit, this filed specifies the action that needs to be taken for the violating traffic.<br>= 0 indicates discard the packet<br>= 1 indicates send flow control packet back to the source<br>= 2 indicates pass the packet |
| CBS_Limit_Action | If the incoming port information rate exceeds the CIR_Limit, this filed specifies the action that needs to be taken for the violating traffic.<br>= 0 indicates discard the packet<br>= 1 indicates send flow control packet back to the source<br>= 2 indicates pass the packet |
| EBS_Limit | Excess Burst Size Limit<br>The field indicates the excess burst size amount. |
| CBS_Limit | Committed Burst Size Limit<br>The field indicates the committed burst size amount. |
| Bucket_Update_Interval | This field indicates the rate at which the bucket needs to be updated with tokens. |
| Bucket_Increment | This field indicates the amount of tokens that need to be added per each bucket increment. |
| Bucket_RateType | = 1 indicates the bucket is rate based<br>= 0 indicates the bucket is traffic type based |
| Bucket_Type_Mask | This bit field has the following definition when Bucket_Rate_Type = 1'b0:<br>[0] - Multicast<br>[1] - ARP<br>[2] - Pause<br>[3] - BPDU<br>[4] - TCP CTRL<br>[5] - TCP DATA<br>[6] - UDP<br>[7] - NonTCPUDP<br><br>This bit field has the following definition when Bucket_Rate_Type = 1'b1:<br>[0] - Frame mode<br>[1] - Count layer1 bits<br>[2] - Count layer2 bits<br>[3] - Count layer3 bits |
| Bucket_Token_Count | This variable indicates the current number of tokens available in the current bucket. The initial value is expected to be programmed during initialization of the device or chip. |
| Last_Update_Time | This variable indicates the last time the bucket was updated with the tokens. |
| Current_Time_Update_Interval | This variable indicates the update interval for the current time. |
| HMode | This variable indicates that the rate limiting is performed in hierarchical mode where all buckets beginning with bucket 0 are looked at only if the current bucket has exceeded the traffic SLA. |
| Rate_Bucket_Mask | This variable specifies the rate buckets associated with a specific port that must be considered for the hierarchical rate limiting. |

FIG. 3

HIERARCHICAL PORT-BASED RATE LIMITING

RELATED APPLICATIONS

This application claims the benefit of priority to U.S. Provisional Application No. 60/867,258 filed Nov. 27, 2006, titled "Method and Apparatus for Hierarchical Port-Based Rate Limiting," which is herein incorporated by reference in its entirety. This application is also related to U.S. Provisional Application No. 60/741,602, filed Dec. 2, 2005, and U.S. patent application Ser. No. 11/411,616, filed Apr. 26, 2006, titled, "Flexible Port Rate Limiting," which are also incorporated herein by reference.

FIELD OF THE INVENTION

The present invention is generally related to rate limiting traffic entering a service provider's network and, more specifically, to using port-based hierarchical rate limiting to regulate traffic flow entering the service provider's network.

BACKGROUND OF THE INVENTION

A service provider's network is often comprised of several customers utilizing a variety of services delivered through individual transmission media. Often, the individual connections, or downlinks, between the customer premises and the service provider are combined into one or more uplinks. The uplinks form the physical connection to the service provider's network, whereby traffic is both transmitted and received from the customers. Traffic congestion can be a common challenge experienced by service providers in networks utilizing uplinks. In this situation, the rate and or volume of the aggregate incoming customer traffic exceeds the egress capacity of the network equipment. Using rate limiting, a service provider can limit the aggregate bandwidth at the network ingress. By setting a maximum allowed traffic rate and or volume entering a specific port, the service provider ensures that each customer has access to the agreed upon bandwidth stated in their service level agreement (SLA).

The SLA executed between the service provider and the customer establishes the terms of the relationship between the two parties. The SLA describes the services to be provided and the manner in which those services will be delivered. Prior to provisioning a service, both the service provider and the customer mutually define the nature of the data transmission rate for a particular service. The SLA typically defines data transmission parameters that govern the customers' transmission of data to the service provider, such as committed information rate (CIR), committed burst size (CBS), and excess burst size (EBS). If the subscriber transmits data according to the CIR, CBS, and EBS guidelines set forth in the SLA, the service provider will attempt to deliver the information according to its obligations. In a network with several customers, each with different SLAs, a service provider must ensure that it complies with the data transmission requirements of each agreement. Therefore, a service provider must have the ability to track the rate and volume of traffic entering and exiting its network at any given port in order to ensure that each customer receives no more than the agreed upon bandwidth. Rate limiting is one approach used to enforce bandwidth consumption. Traditional rate limiting provides a mechanism to determine if a subscriber is conforming with the agreed upon bandwidth consumption requirements and a process to determine what actions need to be taken if a subscriber violates the bandwidth consumption requirements.

A common solution for rate limiting uses a traffic bucket for a given port. A traffic bucket operates by placing the incoming network traffic in a queue. The queue delays the incoming traffic and releases it into the service providers network at a fixed rate. Often, a bucket is assigned to a specific port at the ingress of the service provider's network and is used to monitor traffic at an aggregate level.

However, the types of Internet services available are expanding beyond traditional data services. Traditional data services are primarily time delivery insensitive. However, real-time services such as Voice over IP (VoIP), IPTV, and gaming are extremely sensitive to delay and service interruptions. Network congestion can create interruptions to video conferencing and VoIP services that are very noticeable to the end user. Moreover, interruptions to real-time services can have a proportionately larger impact on the quality of the service as compared to traditional data services. The network equipment must be able to distinguish the type of information entering the network in order to deliver real-time services with a reasonable quality of service. Thus, real-time applications require network equipment capable of intelligent rate limiting schemes that are application-aware in order to prioritize the delivery of specific classes of traffic.

It is well recognized by those skilled in the art that Layer 4 of the OSI protocol stack defines the session layer. The session layer serves as the primary communication mechanism between the actual customer application and the lower-level hardware centric physical layers. Transport control protocol (TCP), user datagram protocol (UDP), and real time transport protocol (RTP) are examples of transport, or layer 4, protocols that directly interface with applications such as file transfer program (FTP), streaming media applications, and VoIP applications.

There are, however, fundamental operational differences between the various layer 4 protocols. UDP, for example, is a connectionless protocol. TCP, on the other hand, is a connection oriented protocol, which is often regarded as more reliable than UDP. In the case of TCP, the receipt of each byte is acknowledged by the receiver, which is then communicated back to the sender. These acknowledgement packets, referred to as TCP-ACK packets, create interesting traffic dynamics in the context of port-based rate limiting. In order to achieve data transmission throughput for applications using TCP and other layer 4 protocols, having a rate limiting scheme that is aware of the traffic patterns and distribution of data and control packets is essential.

A service provider often faces the challenge of controlling the information rate received by the customer. For example, traffic exceeding an agreed upon service level agreement between the service provider and the client can be managed based on the TCP port number. This intelligent method of performing an action based upon traffic exceeding an SLA is sometimes referred to a hierarchical rate limiting.

In other cases, hierarchical rate limiting is based on traffic priority. For example, a service provider may allow 2 Mbits per second of Priority3 traffic, 700 Mbit per second of Priority2 traffic, 1 Mbit per second of Priority1 traffic and 512 Kbits per second of best effort traffic. It is well recognized by those skilled in the art that it is common for customers to expect that a given information stream has more best effort traffic that either Priority3, Priority2 or Priority1 traffic.

Intelligent rate limiting schemes may help service providers ensure real-time applications are delivered without delay. However, some intelligent rate limiting schemes do not provide a mechanism for lower priority traffic classes to use available bandwidth capacity allocated to real time services. In situations where a subscriber uses a mix of real-time and traditional data services, a rate limit hierarchy can be used to enable lower priority traffic to use unused bandwidth allocated to real-time functions when real-time traffic is not flowing. It would be desirable to provide a method and apparatus that adds intelligence to a service provider's network by rate limiting the ingress ports using a hierarchy of rate buckets to apply a common rate limit to several classes of service, thus enabling them to share available bandwidth in order to achieve the final information rate expected by the customer.

SUMMARY OF THE INVENTION

In accordance with at least one embodiment of the invention, a method for regulating traffic in a computer network by assigning a plurality of rate buckets to a network interface port, associating at least two of the rate buckets hierarchically, monitoring at least one traffic parameter by each of the rate buckets, associating a packet threshold parameter with each rate bucket, performing a packet action based on packets exceeding the packet threshold parameter, and passing packets exceeding the packet threshold parameter to a subsequent rate bucket within the hierarchy based on the resulting packet action of the previous rate bucket.

In accordance with the invention, a system for regulating traffic in a computer network comprises a plurality of rate buckets associated with a network interface ingress port. An exemplary system includes at least two rate buckets, related hierarchically, assigned to a specific ingress port on a network equipment device. At least one traffic parameter is associated with each rate bucket. Each rate bucket monitors traffic based on individual user-defined traffic parameters. At least one packet threshold parameter is associated with each rate bucket. Packets exceeding a rate bucket's packet threshold parameter are routed to subsequent rate buckets within the hierarchy based on an aggregate information rate assigned to the port. Each hierarchical rate bucket assigned to a specific port evaluates each packet prior to discarding a packet.

In accordance with at least one embodiment of the invention, a computer-readable medium storing computer programs executable by a computer to perform a method for regulating traffic in a computer network by assigning a plurality of rate buckets to a network interface port, associating at least two of the rate buckets hierarchically, monitoring at least one traffic parameter by each of the rate buckets, associating a packet threshold parameter with each rate bucket, performing a packet action based on packets exceeding the packet threshold parameter, and passing packets exceeding the packet threshold parameter to a subsequent rate bucket within the hierarchy based on the resulting packet action of the previous rate bucket.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 3 illustrates a table of exemplary resource settings specific to each rate bucket.

DESCRIPTION OF THE EMBODIMENTS

Reference will now be made in detail to embodiments of the inventions, examples of which are illustrated in the accompanying drawings. Wherever possible, the same reference numbers will be used throughout the drawings to refer to the same or like parts.

Figure 1:
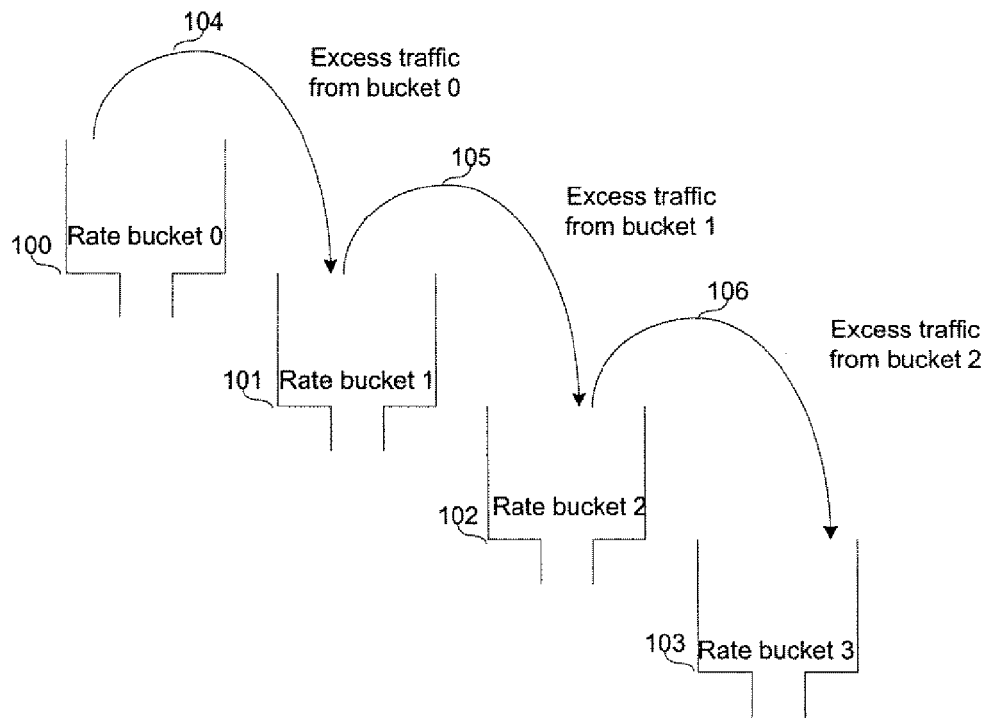
FIG. 1 illustrates a conceptual diagram of an exemplary hierarchical rate limiting scheme according to an embodiment of the present invention.

FIG. 1 illustrates an exemplary method for performing port ingress rate limiting using rate buckets implemented in a hierarchical relationship. Here, Rate Bucket 0 100, Rate Bucket 1 101, Rate Bucket 2 102, and Rate Bucket 3 103 are programmed to operate hierarchically at a specific ingress port of a service provider's network. Traffic is first evaluated by Rate Bucket 0 100 based on user-defined traffic thresholds. If incoming traffic exceeds the traffic thresholds defined for Rate Bucket 0 100, excess traffic 104 is sent to Rate Bucket 1. Similarly, if the traffic 104 exceeds the traffic thresholds defined for Rate Bucket 1 101, the excess traffic 205 is sent to Rate Bucket 2 102. Any excess traffic 106 from Rate Bucket 2 102 will be sent to Rate Bucket 3 in a similar manner.

The hierarchical rate limiting method described in the previous example can be used in an enterprise/service provider environment. In this application, a set of hierarchical rate buckets is allocated to a specific ingress port within the service provider's network. The first rate bucket is programmed to accept a specific aggregate percentage of network traffic. The specific aggregate percentage can be used to define the rate bucket threshold. The other rate buckets assigned to the port are similarly programmed to accept a fixed percentage of the remaining bandwidth based on traffic priority. For example, a service provider can configure a first rate bucket to accept 75% of incoming information rate and Rate Bucket 2 can be programmed to track priority 1 traffic for 10% of the agreed information rate. Similarly, Rate Bucket 3 can be programmed to track priority 2 traffic for the remaining 15% of the agreed information rate.

Figure 2:
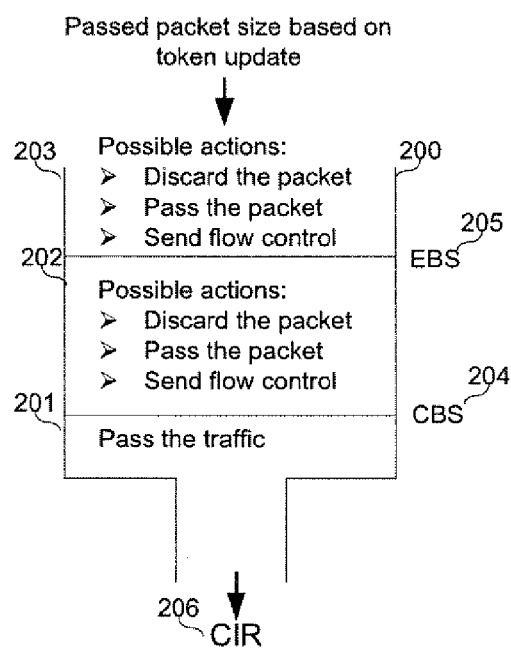
FIG. 2 illustrates a conceptual diagram of an exemplary leaky bucket-based rate limiting scheme according to an embodiment of the present invention.

A leaky bucket rate limiting scheme can be implemented as illustrated in FIG. 2. A Rate Bucket 200 receives tokens that correspond to arriving packets. It will be readily appreciated by one of ordinary skill in the art that a token controls when traffic can be transmitted, based on the presence of tokens in a rate bucket. A token can represent a unit of bytes or a single packet and a packet. The number of tokens may be proportional to the size of the packets, measured in bytes, or may be a fixed value independent of packet size. Tokens flow out of Rate Bucket 200 at a specific rate 206 referred to as the Committed Information Rate (CIR). If tokens arrive at a rate faster than the CIR, the rate bucket will begin to fill.

Until the tokens in the Rate Bucket 200 reach a first threshold 204, called the Committed Burst Size, packets are passed 201 to the ingress port, and tokens are added to Rate Bucket 200. If the tokens corresponding to a packet cause the tokens in the bucket 200 to exceed the CBS, a second packet action 202 is performed. The second packet action 202 may also include passing the packet, or it may involve discarding the packet or sending a flow control packet back to the source. If tokens corresponding to a packet cause the Rate Bucket 200 to exceed a second threshold 205, called the Excess Burst Size (EBS), a third packet action is performed. Any of the packet actions possible for the second packet action are suitable for the third packet action.

FIG. 3 illustrates a table of exemplary resource settings, which are stored individually for each resource bucket. In FIG. 3, EBS_Limit_Action specifies what action should be taken when the tokens corresponding to a packet exceed the EBS_Limit. If the EBS_Limit_Action field is set to 0, the packet is discarded. Similarly, when the EBS_Limit_Action field is set to 1 or 2, the corresponding resource bucket sends a flow control packet to the source or passes the packet respectively. A parallel field, CBS_Limit_Action, specifies what action should be taken when the tokens corresponding to a packet exceed the CBS_Limit. In the exemplary embodiment of FIG. 3, values 0, 1 and 2 correspond to discarding the packet, sending a flow control packet to the source, and passing the packet.

EBS_Limit corresponds to the number of tokens that define the Excess Burst Size (EBS) limit of the associated resource bucket. Similarly, CBS_Limit corresponds to the number of tokens that define the Committed Burst Size (CBS) limit of the associated resource bucket.

Bucket_Update_Interval specifies the token update rate for the associated resource bucket. In the exemplary embodiment in FIG. 3, the Bucket_Update_Interval is inversely proportional to the Committed Information Rate (CIR), A Bucket_Rate_Type setting specifies how to calculate tokens from the packet contents. In one implementation, a Bucket_Rate_Type value of 0 indicates the resource bucket is rate based, and thus tokens are counted only for certain packet types. If the value of the Bucket_Rate_Type field is 1, the corresponding resource bucket is defined as rate based. In this case, certain bytes of every packet are counted as tokens.

A Bucket_Type_Mask setting determines which packet types or specific bytes within every packet are counted as tokens. The Bucket_Rate_Type is a bit field, allowing the individual selection of certain packet types or specific bits within a packet. If the Bucket_Rate_Type field is set to 1'∝b0, multicast, ARP, Pause, Bridge Protocol Data Units (BPDU), TCP control, TCP data, UDP, and non-TCP/UDP packets can be selected. Many other packet types, packet grouping, or a combinations of packet types and packet groupings are possible. If the Bucket_Rate_Type field is set to 1'b1, the resource bucket, configured as rate type, can select frame mode, count layer 1 bits, count layer 2 bits, or count layer 3 bits.

Bucket_increment specifies how many tokens are added to the bucket for each unit (byte) of qualifying port traffic. Bucket_Token_Count specifies the current number of tokens available in the current resource bucket. In the exemplary embodiment in FIG. 3, programmed during system or chip initialization, the Bucket_Token_Count is set to the CBS. The Last_Update_Time stores the interval number when the Bucket_Token_Count was last updated. The Last_Update_Time is also initialized with a value during system or chip initialization. In the exemplary embodiment in FIG. 3, Last_Update_Time is set to 0 during system or chip initialization.

Current_Time_Update_Interval specifies the update interval for the current time. Essentially functioning as a clock divisor, the variable Current_Time increments every Current_Time_Update_Interval number of clocks cycles. Current_Time maintains a running counter of the elapsed time after the device resumes from reset. The values of Current_Time_Update_Interval may be powers of 2, or may be less exponential, such as 2, 4, 8, 16, 24, 36, 48, and 72. For example, a clock rate of 50 MHz or 20 ns, and a Current_Time_Update_Interval of 4, corresponds to a current time incremented every 80 ns.

As would be recognized by those skilled in the art, initial values for the fields specified in FIG. 3 can be selected based on the specific system requirements. In the exemplary embodiment of FIG. 3, however, the Bucket_Rate_Factor, expressed as tokens per interval, is set based on the CIR. The Bucket_Rate_Factor can be expressed in terms of the CIR as follows, Bucket_Rate_Factor (tokens/interval)=Bucket_Increment (token/byte)*1/8 (bytes/bit)*CIR (bits/s)* clock speed (s/clock tick)*Current_Time_Update_Interval (clock ticks/interval). EBS_Limit can be set, for example, as EBS_Limit (tokens)=(Expected burst rate (bits/s)− CIR (bits/s))*Expected burst duration (s)*1/8 (bytes/bit)* Bucket_Increment (tokens/byte). The CBS_Limit can be set in a similar manner.

Figure 4:
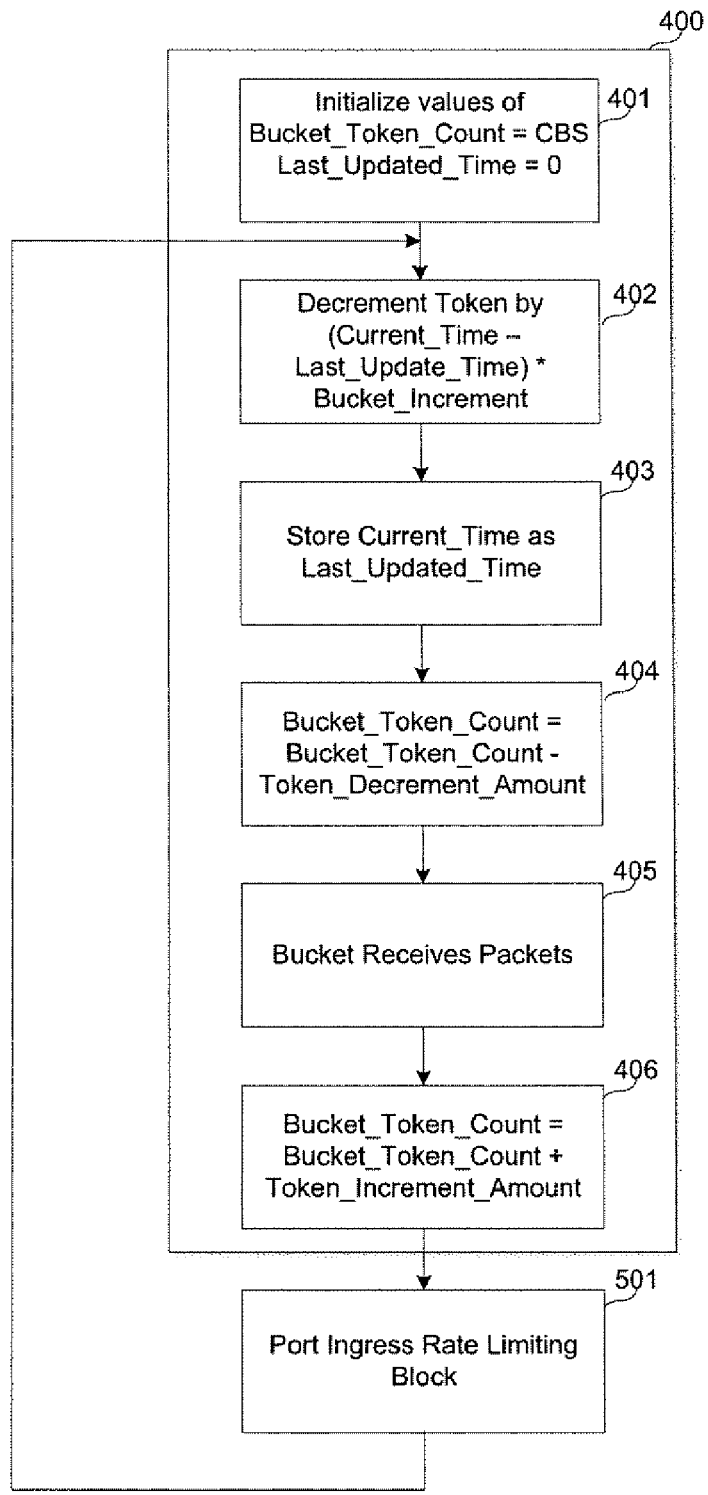
FIG. 4 illustrates a flow chart describing an exemplary method of hierarchical port-based rate limiting.

FIG. 4 illustrates an exemplary method of hierarchical port-based rate limiting. In step 401, Bucket_Token_Count is set to CBS and Last_Updated_Time is set to 0 for each rate bucket resource. In step 402, Bucket_Token_Count is decremented according to Token_Decrement_Amount=(Current_Time−Last_Update_Time)*Bucket_Increment. In step 403, Current_Time is updated in intervals as specified in the Current_Time register and the Current_Time_Update_Interval value. In the exemplary embodiment in step 403, Current_Time is stored into Last_Update_Time. In step 404, Bucket_Token_Count is updated based on the Token_Decrement_Amount. Subsequently, a packet is received by the bucket in step 405. In step 406, the value of Bucket_Token_Count is updated based on the bytes received by the bucket according to Bucket_Token_Count=Bucket_Token_Count+Token_Increment_Amount. The result of step 406 is passed to port ingress rate limiting block, step 501, which is illustrated in FIG. 5.

Figure 5:
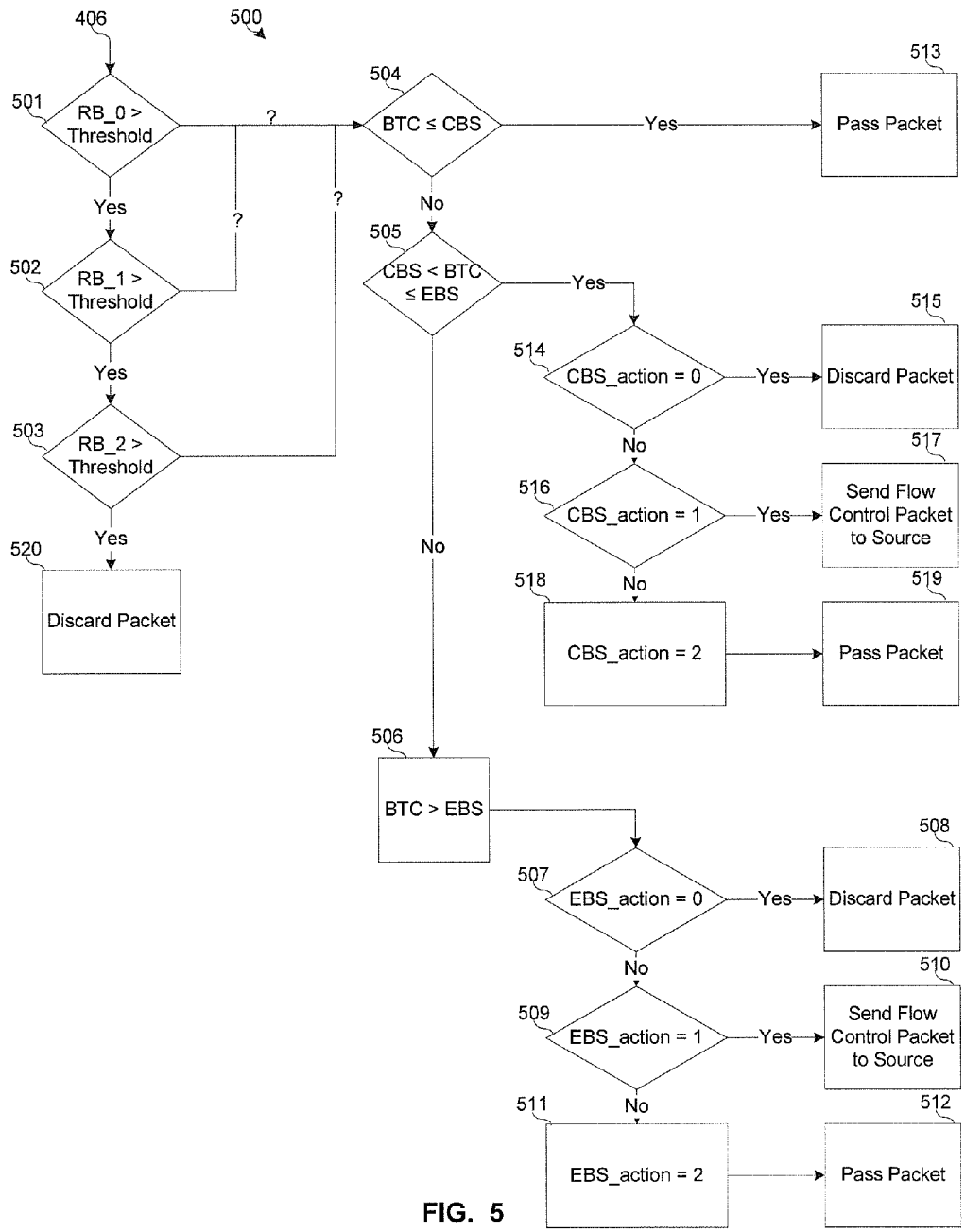
FIG. 5 illustrates a flow chart describing the operation of an exemplary port-ingress rate limiting block according to the embodiments of the present invention.

FIG. 5 illustrates an exemplary method for performing hierarchical ingress port-base rate limiting. In step 500, an exemplary method illustrates a port-based rate limiting block. The port-based rate limiting block translates application traffic requirements into rate limited traffic for a specific application configured for multiple rates. In the exemplary method in FIG. 5, the hierarchical relationship between the set of rate buckets, allocated to a specific port, can be programmed to produce a desired final information rate.

In step 501, data traffic enters Rate Bucket 0, where the traffic is evaluated against data traffic thresholds. In step 504, the Bucket_Token_Count resulting from the packets received in Rate Bucket 0 is compared to the CBS. If the corresponding Bucket_Token_Count is less than or equal to the CBS, the packet is passed to the port, as illustrated in step 513. However, if the Bucket_Token_Count is greater than the CBS and less than or equal to the EBS, as illustrated in step 505, the Rate Bucket 0 will take a specific packet action according to the CBS_Limit_Action. In step 514, if the CBS_Limit_Action corresponding to Rate Bucket 0 is programmed with a value of 0, the packet is discarded as illustrated in step 515.

Similarly, if the CBS_Limit_Action corresponding to Rate Bucket 0 is programmed with a value of 1, a flow control packet is transmitted back to the source, as illustrated in steps 516 and 517, respectively. However, if the CBS_Limit_Action corresponding to Rate Bucket 0 is programmed with a value of 2, the packet is passed, as illustrated in steps 518 and 519, respectively. In step 506, the Bucket_Token_Count is greater than the EBS and Rate Bucket 0 will take a specific packet action according to the EBS_Limit_Action. In step 507, if the EBS_Limit_Action corresponding to Rate Bucket 0 is programmed with a value of 0, the packet is discarded as illustrated in step 508. Similarly, if the EBS_Limit_Action corresponding to Rate Bucket 0 is programmed with a value of 1, a flow control packet is transmitted back to the source, as illustrated in steps 509 and 510, respectively. However, if the EBS_Limit_Action corresponding to Rate Bucket 0 is programmed with a value of 2, the packet is passed, as illustrated in steps 511 and 512, respectively.

If, however, the packet action performed in Rate Bucket 0 results in discarding the packet, as described in steps 515 or 508, the excess traffic is passed to the next rate bucket. In step 502, data traffic enters Rate Bucket 1, where the traffic is evaluated against data traffic thresholds. In step 504, the Bucket_Token_Count resulting from the packets received in Rate Bucket 1 is compared to the CBS. If the corresponding Bucket_Token_Count is less than or equal to the CBS, the packet is passed to the port, as illustrated in step 513. However, if the Bucket_Token_Count is greater than the CBS and less than or equal to the EBS, as illustrated in step 505, the Rate Bucket 1 will take a specific packet action according to the CBS_Limit_Action. In step 514, if the CBS_Limit_Action corresponding to Rate Bucket 1 is programmed with a value of 0, the packet is discarded as illustrated in step 515. Similarly, if the CBS_Limit_Action corresponding to Rate Bucket 1 is programmed with a value of 1, a flow control packet is transmitted back to the source, as illustrated in steps 516 and 517, respectively. However, if the CBS_Limit_Action corresponding to Rate Bucket 1 is programmed with a value of 2, the packet is passed, as illustrated in steps 518 and 519, respectively. In step 506, the Bucket_Token_Count is greater than the EBS and Rate Bucket 1 will take a specific packet action according to the EBS_Limit_Action. In step 507, if the EBS_Limit_Action corresponding to Rate Bucket 1 is programmed with a value of 0, the packet is discarded as illustrated in step 508. Similarly, if the EBS_Limit_Action corresponding to Rate Bucket 1 is programmed with a value of 1, a flow control packet is transmitted back to the source, as illustrated in steps 509 and 510, respectively. However, if the EBS_Limit_Action corresponding to Rate Bucket 1 is programmed with a value of 2, the packet is passed, as illustrated in steps 511 and 512, respectively.

If the packet action performed Rate Bucket 1 results in discarding the packet, as described in steps 515 or 508, the excess traffic is passed to the next rate bucket. In step 503, data traffic enters Rate Bucket 2, where the traffic is evaluated against data traffic thresholds. In step 504, the Bucket_Token_Count resulting from the packets received in Rate Bucket 2 is compared to the CBS. If the corresponding Bucket_Token_Count is less than or equal to the CBS, the packet is passed to the port, as illustrated in step 513. However, if the Bucket_Token_Count is greater than the CBS and less than or equal to the EBS, as illustrated in step 505, the Rate Bucket 2 will take a specific packet action according to the CBS_Limit_Action. In step 514, if the CBS_Limit_Action corresponding to Rate Bucket 2 is programmed with a value of 0, the packet is discarded as illustrated in step 515. Similarly, if the CBS_Limit_Action corresponding to Rate Bucket 2 is programmed with a value of 1, a flow control packet is transmitted back to the source, as illustrated in steps 516 and 517, respectively. However, if the CBS_Limit_Action corresponding to Rate Bucket 2 is programmed with a value of 2, the packet is passed, as illustrated in steps 518 and 519, respectively. In step 506, the Bucket_Token_Count is greater than the EBS and Rate Bucket 2 will take a specific packet action according to the EBS_Limit_Action. In step 507, if the EBS_Limit_Action corresponding to Rate Bucket 2 is programmed with a value of 0, the packet is discarded as illustrated in step 508. Similarly, if the EBS_Limit_Action corresponding to Rate Bucket 2 is programmed with a value of 1, a flow control packet is transmitted back to the source, as illustrated in steps 509 and 510, respectively. However, if the EBS_Limit_Action corresponding to Rate Bucket 2 is programmed with a value of 2, the packet is passed, as illustrated in steps 511 and 512, respectively. Once the data is evaluated based on the thresholds assigned to Rate Bucket 2 in step 503, a final packet discard decision can be made, as illustrated in step 520.

Generally speaking, FIG. 5 illustrates an exemplary method whereby each port ingress rate limiting resource bucket performs a packet action based on whether the previous resource bucket's thresholds have been exceeded.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the inventions will be apparent to those skilled in the art from consideration of the specification and practice of the inventions disclosed herein. It is intended that the specification and examples be considered as exemplary only, with a true scope and spirit of the invention being indicated by the following claims.

What is claimed is:

1. A computer-implemented method for regulating traffic in a computer network, the method comprising:
   assigning a plurality of rate buckets to a network interface port, wherein the network interface port is configured to receive network data traffic comprising packets, and wherein the plurality of rate buckets comprise at least a first rate bucket and a second rate bucket that are related hierarchically;
   accepting the network data traffic comprising the packets into the first rate bucket;
   performing a packet action based on counting tokens corresponding to the received packets and determining if an amount of the network data traffic exceeds a service provider user-defined rate bucket threshold for the first rate bucket; and
   passing the received packets of the network data traffic in the first rate bucket that exceed the service provider user-defined rate bucket threshold to the second rate bucket within the hierarchy based on a result of the packet action of the first rate bucket in the hierarchy;

wherein the first rate bucket is programmed to accept a percentage of network data traffic, wherein the percentage is designated by the service provider user-defined rate bucket threshold; and configuring the first rate bucket to monitor traffic rate by:

counting specific bytes or bits within a packet as tokens, wherein the specific bytes or bits include at least one of frame mode, count layer1 bits, count layer2 bits, and count layer3 bits.

2. The method of claim 1, further comprising:

operating one or more rate buckets in a non-hierarchical mode, wherein each rate bucket operating in the non-hierarchical mode operates independently of rate buckets operating in a hierarchical mode.

3. The method of claim 1, further comprising:

monitoring at least one traffic parameter associated with each rate bucket; and associating at least one packet threshold parameter with each rate bucket.

4. The method of claim 3, wherein at least one rate bucket is configured to monitor traffic type.

5. The method of claim 4, wherein the traffic type includes at least one of the following: multicast, Address Resolution Protocol (ARP), Bridge Protocol Data Units (BDPU), Transport Control Protocol (TCP) control, TCP data, User Datagram Protocol (UDP), or non-TCP/UDP.

6. The method of claim 3, wherein associating at least one packet threshold parameter with each rate bucket further comprises:

configuring the at least one packet threshold parameter of each rate bucket to be at least one of a committed burst size threshold or an excess burst size threshold.

7. The method of claim 1, wherein passing packets exceeding the service provider user-defined rate bucket threshold to the second rate bucket within the hierarchy based on the resulting packet action of the first rate bucket in the hierarchy further comprises:

sending packets discarded from a nth rate bucket to a nth+1 rate bucket;

evaluating whether the discarded packets sent from the nth rate bucket to the nth+1 rate bucket exceed a traffic parameter threshold for the nth+1 rate bucket; sending packets discarded from the nth+1 rate bucket to a nth+2 rate bucket;

evaluating whether the discarded packets sent from the nth+1 rate bucket to the nth+2 rate bucket exceed a traffic parameter threshold for the nth+2 rate bucket, wherein the nth+2 rate bucket is a last rate bucket in the hierarchy; and performing a final packet discard by discarding packets exceeding a traffic parameter threshold for the last rate bucket in the hierarchy.

8. A computer-implemented method for regulating traffic in a computer network, the method comprising:

assigning a plurality of rate buckets to a network interface port, wherein the network interface port is configured to receive network data traffic comprising packets, and wherein the plurality of rate buckets comprise at least a first rate bucket and a second rate bucket that are related hierarchically;

accepting the network data traffic comprising the packets into the first rate bucket;

performing a packet action based on counting tokens corresponding to the received packets and determining if an amount of the network data traffic exceeds a service provider user-defined rate bucket threshold for the first rate bucket; and passing the received packets of the network data traffic in the first rate bucket that exceed the service provider user-defined rate bucket threshold to the second rate bucket within the hierarchy based on a result of the packet action of the first rate bucket in the hierarchy;

monitoring at least one traffic parameter associated with each rate bucket;

associating at least one packet threshold parameter with each rate bucket, wherein associating at least one packet threshold parameter with each rate bucket further comprises configuring the at least one packet threshold parameter of each rate bucket to be at least one of a committed burst size threshold or an excess burst size threshold;

performing at least one packet action when a number of tokens corresponding to the received data traffic less than or equal to the committed burst size threshold;

associating a first plurality of packet actions with received data traffic exceeding the committed burst size threshold but less than or equal to the excess burst size threshold; and associating a second plurality of packet actions with received data traffic exceeding the excess burst size threshold.

9. The method of claim 8, wherein associating a first plurality of packet actions with received data traffic exceeding the committed burst size threshold but less than or equal to the excess burst size further comprises one of:

discarding a packet, sending a flow control packet back to a source, or passing the packet to the network.

10. The method of claim 9, wherein discarding a packet further comprises:

passing the packet to a subsequent rate bucket for evaluation.

11. The method of claim 8, wherein associating a second plurality of packet actions for received data traffic exceeding the excess burst size threshold further comprises one of:

discarding a packet, sending a flow control packet back to a source, or passing the packet to the network.

12. The method of claim 11, wherein discarding a packet further comprises:

passing the packet to a subsequent rate bucket for evaluation.

13. A computer-implemented method for regulating traffic in a computer network, the method comprising:

assigning a plurality of rate buckets to a network interface port, wherein the network interface port is configured to receive data traffic comprising packets, and wherein at least two rate buckets are related hierarchically;

performing a packet action based on counting tokens corresponding to the received packets that exceed a service provider user-defined rate bucket threshold;

passing the received packets that exceed the service provider user-defined rate bucket threshold to a subsequent rate bucket within the hierarchy based on a resulting packet action of a previous rate bucket in the hierarchy;

monitoring at least one traffic parameter associated with each rate bucket, wherein monitoring at least one traffic parameter associated with a rate bucket further comprises configuring a rate bucket to monitor traffic rate, and wherein configuring the rate bucket to monitor traffic rate comprises counting specific bytes or bits within a packet as tokens, wherein the specific bytes or bits include at least one of frame mode, count layer1 bits, count layer2 bits, and count layer3 bits; and associating at least one packet threshold parameter with each rate bucket.

14. A computer-implemented method for regulating traffic in a computer network, the method comprising:
- assigning a plurality of rate buckets to a network interface port, wherein the network interface port is configured to receive data traffic comprising packets, and wherein at least two rate buckets are related hierarchically;
- performing a packet action based on counting tokens corresponding to the received packets that exceed a service provider user-defined rate bucket threshold;
- passing the received packets that exceed the service provider user-defined rate bucket threshold to a subsequent rate bucket within the hierarchy based on a resulting packet action of a previous rate bucket in the hierarchy; and
- monitoring at least one traffic parameter associated with each rate bucket;
- associating at least one packet threshold parameter with each rate bucket, wherein associating at least one packet threshold parameter with each rate bucket further comprises, configuring the at least one packet threshold parameter of each rate bucket to be at least one of a committed burst size threshold or an excess burst size threshold;
- performing at least one packet action when a number of tokens corresponding to the received data traffic less than or equal to the committed burst size threshold;
- associating a first plurality of packet actions with received data traffic exceeding the committed burst size threshold but less than or equal to the excess burst size threshold; and
- associating a second plurality of packet actions with received data traffic exceeding the excess burst size threshold.

15. The method of claim 14, wherein associating a first plurality of packet actions with received data traffic exceeding the committed burst size threshold but less than or equal to the excess burst size further comprises one of:
- discarding a packet,
- sending a flow control packet back to a source, or
- passing the packet to the network.

16. The method of claim 15, wherein discarding a packet further comprises:
- passing the packet to a subsequent rate bucket for evaluation.

17. The method of claim 16, wherein discarding a packet further comprises:
- passing the packet to a subsequent rate bucket for evaluation.

18. The method of claim 14, wherein associating a second plurality of packet actions for received data traffic exceeding the excess burst size threshold further comprises one of:
- discarding a packet,
- sending a flow control packet back to a source, or
- passing the packet to the network.

* * * * *